(12) United States Patent
McGinnis et al.

(10) Patent No.: US 7,767,606 B2
(45) Date of Patent: Aug. 3, 2010

(54) LOW VISCOSITY E-GLASS COMPOSITION ENABLING THE USE OF PLATINUM AND RHODIUM FREE BUSHINGS

(75) Inventors: Peter B. McGinnis, Gahanna, OH (US); Douglas A. Hofmann, Hebron, OH (US)

(73) Assignee: OCV Intellectual Capital, LLC DE (US)

( * ) Notice: Subject to any disclaimer, the term of this patent is extended or adjusted under 35 U.S.C. 154(b) by 645 days.

(21) Appl. No.: 11/724,446

(22) Filed: Mar. 15, 2007

(65) Prior Publication Data
US 2008/0227615 A1 Sep. 18, 2008

(51) Int. Cl.
C03C 3/091 (2006.01)
C03C 13/06 (2006.01)
C03C 13/00 (2006.01)

(52) U.S. Cl. ............... 501/66; 501/35; 501/36; 65/492; 65/493

(58) Field of Classification Search ............... 501/35, 501/36, 66; 65/492, 493
See application file for complete search history.

(56) References Cited

U.S. PATENT DOCUMENTS

| | | | |
|---|---|---|---|
| 2,334,961 A | 11/1943 | Schoenlaub | |
| 2,571,074 A | 10/1951 | Tiede et al. | |
| 3,013,888 A | 12/1961 | Lajarte | |
| 3,166,428 A | 1/1965 | Thomas | |
| 3,488,172 A * | 1/1970 | Aliotta et al. | 65/493 |
| 3,647,382 A * | 3/1972 | Tilbrook | 65/512 |
| 3,969,121 A | 7/1976 | Atkinson | |
| 4,026,715 A | 5/1977 | Erickson et al. | |
| 4,066,466 A * | 1/1978 | Neely, Jr. | 501/35 |
| 4,155,731 A * | 5/1979 | Byrnes et al. | 65/492 |
| 4,166,747 A | 9/1979 | Neely | |
| 4,542,106 A | 9/1985 | Sproull | |
| 4,566,888 A * | 1/1986 | Schaefer | 65/493 |
| 5,051,235 A | 9/1991 | Guerlet et al. | |
| 5,616,525 A | 4/1997 | Rapp et al. | |
| 5,910,461 A * | 6/1999 | Gasca et al. | 501/35 |
| 5,948,196 A | 9/1999 | Huang | |
| 6,136,735 A | 10/2000 | Gallo et al. | |
| 6,156,683 A | 12/2000 | Grove-Rasmussen et al. | |
| 6,381,989 B1 * | 5/2002 | Karmaker et al. | 65/384 |
| 6,686,304 B1 * | 2/2004 | Wallenberger | 501/35 |
| 6,962,886 B2 | 11/2005 | Wallenberger | |
| 7,022,634 B2 | 4/2006 | Hamilton et al. | |
| 7,449,419 B2 * | 11/2008 | Li | 501/36 |
| 2005/0107238 A1 * | 5/2005 | Li | 501/35 |
| 2008/0141726 A1 * | 6/2008 | Purvis et al. | 65/475 |

FOREIGN PATENT DOCUMENTS

| JP | 48037411 | 6/1973 |
|---|---|---|
| RO | 64230 | 11/1978 |

OTHER PUBLICATIONS

International Search Report dated Jun. 6, 2008 in PCT/US2008/057005.

* cited by examiner

*Primary Examiner*—Karl E Group
*Assistant Examiner*—Elizabeth A Bolden
(74) *Attorney, Agent, or Firm*—James J. Dottavio; Joan N. Drew

(57) ABSTRACT

A low viscosity E-glass composition including $SiO_2$ in an amount ranging from 52-54 weight percent, $Al_2O_3$ in an amount ranging from 12-14 weight percent, $F_2$ in an amount ranging from 0-1.0 weight percent, $Fe_2O_3$ in an amount ranging from 0 to 0.8 weight percent, $Na_2O$ in an amount ranging from 0-2.0 weight percent, $K_2O$ in an amount ranging from 0-2.0 weight percent, CaO in an amount ranging from 16-23 weight percent, MgO in an amount ranging from 0-3.0 weight percent, $Li_2O$ in an amount ranging from 0-3.0, $TiO_2$ in an amount ranging from 0-1.5 weight percent, ZnO in an amount ranging from 0-4.0 weight percent, and $B_2O_3$ in an amount ranging from 8.0-10 weight percent is provided. The glass composition has a log 3 viscosity temperature between 1750 and 2150° F. and a ΔT temperature greater than 50° F.

12 Claims, No Drawings

LOW VISCOSITY E-GLASS COMPOSITION ENABLING THE USE OF PLATINUM AND RHODIUM FREE BUSHINGS

TECHNICAL FIELD AND INDUSTRIAL APPLICABILITY OF THE INVENTION

The present invention relates generally to a glass composition, and more particularly, to glass compositions that enable the production of E-glass products utilizing metal alloy bushings that do not contain platinum or rhodium.

BACKGROUND OF THE INVENTION

Fiberglass is manufactured from various raw materials combined in specific proportions to yield a desired chemical composition. This proportion is commonly termed a "glass batch." The composition of the glass batch and the glass manufactured from it are typically expressed in terms of percentages of the components, which are expressed as oxides. $SiO_2$, $Al_2O_3$, CaO, MgO, $B_2O$, $Na_2O$, $K_2O$, $Fe_2O_3$, and minor amounts of other oxides are common components of a glass batch. Numerous types of glasses may be produced from varying the amounts of these oxides, or eliminating some of the oxides, in the glass batch. Examples of such glasses that may be produced include E-glass, S-glass, R-glass, A-glass, C-glass, and ECR-glass. The glass composition determines the properties of the glass including properties such as the viscosity, the liquidus temperature, the durability, the density, the strength, and the Young's modulus of the glass. Non-physical considerations given to commercial glass compositions include the raw material cost and environmental impact caused by manufacturing the glass.

E-glass compositions are the most common glass compositions for making continuous glass fiber strands used in textile and reinforcement applications. One advantage of E-glass is that its liquidus temperature is approximately 200° F. below its forming temperature, which is commonly defined as the temperature at which the viscosity of the glass equals 1000 poise. E-glass has a wide range of forming temperatures and a low devitrification rate. Historically, commercial E-glass compositions possessed forming temperatures between 2150° F. and 2350° F. and liquidus values from approximately 100° F. to 250° F. below the forming temperature.

Producing glass fibers from E-glass compositions is well-known in the fiberglass industry. To be defined as an E-glass according to ASTM D578, the glass composition is composed primarily of the oxides of calcium, aluminum, and silicon. E-glass for use in glass fiber products for general applications as defined by ASTM D578 contains the components in the ranges set forth in Table 1. ASTM D578 teaches that E-glass for use in glass fiber yarn products for printed circuit boards and in aerospace applications has the components and percentages set forth in Table 2.

TABLE 1

| Chemical | % by weight |
| --- | --- |
| $B_2O_3$ | 0–10 |
| CaO | 16–25 |
| $Al_2O_3$ | 12–16 |
| $SiO_2$ | 52–62 |
| MgO | 0–5 |
| $TiO_2$ | 0–1.5 |
| $Fe_2O_3$ | 0.05–0.8 |
| $F_2$ | 0–1.0 |
| $Na_2O + K_2O$ | 0–2 |

TABLE 2

| Chemical | % by weight |
| --- | --- |
| $B_2O_3$ | 5–10 |
| CaO | 16–25 |
| $Al_2O_3$ | 12–16 |
| $SiO_2$ | 52–56 |
| MgO | 0–5 |
| $TiO_2$ | 0–0.8 |
| $Fe_2O_3$ | 0.05–0.4 |
| $F_2$ | 0–1.0 |
| $Na_2O + K_2O$ | 0–2 |

Attempts have been made to create or modify E-glass compositions to achieve certain desired properties or characteristics. Early efforts to develop E-glasses with good forming characteristics include U.S. Pat. No. 2,334,961 to Schoenlaub and U.S. Pat. No. 2,571,074 to Tiede, et al. The glass compositions taught by Schoenlaub and Tiede, et al. are set forth in Table 3.

TABLE 3

| Chemical | U.S. Pat. No. 2,334,961 (Schoenlaub) % by weight | U.S. Pat. No. 2,571,074 (Tiede, et al.) % by weight |
| --- | --- | --- |
| $B_2O_3$ | 9–11 | 8–13 |
| CaO | 16–19 | 19–25 |
| $Al_2O_3$ | 12–16 | 12–16 |
| $SiO_2$ | 52–56 | 52–56 |
| MgO | 3–6 | — |

To form glass fibers, typically the glass batch is melted, the molten glass is drawn into filaments through a bushing or orifice plate, and an aqueous sizing composition containing lubricants, coupling agents, and film-forming binder resins is applied to the filaments. After the sizing composition is applied, the fibers may be gathered into one or more strands and wound into a package or, alternatively, the fibers may be chopped while wet and collected. The collected chopped strands may then be dried and cured to form dry chopped fibers or they can be packaged in their wet condition as wet chopped fibers.

Current glass compositions, including current E-glass compositions, have a high forming viscosity that requires the use of bushings made from platinum and rhodium. Platinum-rhodium bushings are expensive and increase the manufacturing costs of the glass fibers and products or articles formed from the glass fibers.

Despite the existence of E-glass compositions, there is an existing need in the art for improved or new E-glass compositions that meet the requirements of ASTM D578, that maintain or exceed the physical properties of conventional E-glass compositions, and that possess a viscosity that is low enough to utilize a platinum and rhodium-free bushing and reduce the manufacturing costs associated with the production of E-glass fibers.

SUMMARY OF THE INVENTION

It is an object of the present invention to provide an E-glass composition that includes $B_2O_3$ in an amount from 8-10% by weight, CaO in an amount from 16-23% by weight, $Al_2O_3$ in an amount from 12-14% by weight, $SiO_2$ in an amount from 52-54% by weight, and $Fe_2O_3$ in an amount from 0-0.8% by weight of the total composition. The composition may also include $TiO_2$ in an amount from 0-1.5% by weight, MgO in an amount from 0-3% by weight, $F_2$ in an amount from 0-1% by weight, $Na_2O$ in an amount from 0-2% by weight, $K_2O$ in an amount from 0-2% by weight, $Li_2O$ in an amount from 0-3% by weight, and ZnO in an amount from 0-4% by weight. The phrase % by weight, as used herein, is intended to be defined as the percent by weight of the total composition. In addition, the composition may optionally contain trace quantities of other components or impurities. The E-glass compositions may be used to form continuous glass strands for use as textiles and as reinforcements. E-glass fibers formed by the inventive compositions possess a forming viscosity that is low enough to utilize bushings fabricated from precious metal-based alloys (e.g., palladium-based alloys), stainless steels (e.g., nickel and chromium stainless steels), or Inconel® (a nickel-based alloy with chromium and iron manufactured by Inco Alloys International, Inc). The liquidus temperature of the inventive E-glass compositions is less than about 2100° F., the log 3 temperature is greater than about 20150° F., and the ΔT is greater than or equal to 50° F.

It is another object of the present invention to provide a continuous E-glass fiber formed of the composition described above and produced using a bushing that is free or substantially free of platinum and/or rhodium. The E-glass fibers have a log 3 temperature less than about 2150° F., generally from about 1750° F. to about 2150° F. and a ΔT is greater than or about 50° F., generally from about 50° F. to about 250° F. In addition, the E-glass fibers are able to be formed utilizing low cost platinum and rhodium-free bushings or metal alloy bushings. Examples of materials that may be used to form the platinum and rhodium-free bushings include precious metal-based alloys (e.g., palladium-based alloys), stainless steels (e.g., nickel and chromium stainless steels), or Inconel® (a nickel-based alloy with chromium and iron manufactured by Inco Alloys International, Inc). By utilizing a metal alloy bushing such as a palladium based alloy bushing, manufacturing costs associated with E-glass fiber production, products used in general applications (e.g., reinforcements), and yarn products for printed circuit boards may be dramatically reduced.

It is yet another object of the present invention to provide a method of forming an E-glass fiber. The fibers may be formed by obtaining the raw ingredients and mixing the components in the appropriate quantities to give the desired weight percentages of the final composition. The mixture of raw ingredients is then melted in a melter or furnace and drawn through orifices of a platinum and rhodium-free bushing. The platinum and rhodium-free bushing may be formed from a metal alloy such as a precious metal-based alloy (e.g., palladium-based alloys), stainless steels (e.g., nickel and chromium stainless steels), or Inconel® (a nickel-based alloy with chromium and iron manufactured by Inco Alloys International, Inc). In some embodiments, precious metals such as platinum and/or rhodium may be utilized in the bushing to provide additional structural or mechanical strength to the bushing and/or to provide corrosion resistance. Strands of E-glass fibers are formed by gathering the individual filaments together. The strands may be wound and further processed in a conventional manner suitable for the intended application.

It is an advantage of the present invention that the glass composition possesses a forming viscosity that is low enough to utilize low cost metal alloy bushings instead of conventional high cost platinum-rhodium bushings in the formation of the glass fibers.

It is another advantage of the present invention that the energy necessary to melt the inventive E-glass is less than the energy necessary to melt commercially available E-glass formulations.

It is yet another advantage of the present invention that fibers formed from the inventive E-glass composition may be formed at a lower cost due to the lower energy input needed to melt the glass composition.

It is a feature of the present invention that E-glasses formed from the inventive compositions have a log 3 temperature below 2150° F. and a ΔT greater than about 50° F.

It is another feature of the present invention that the forming viscosity of the inventive E-glass is less than that of E-glass formed from current E-glass compositions.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "composition" and "formulation" may be used interchangeably herein.

The present invention relates to an E-glass composition that complies with the requirements of an "E-glass" in accordance with ASTM D578 and may be used to form continuous glass strands for use as textiles and as reinforcements. The E-glass formed by the inventive composition possesses a forming viscosity that is low enough to enable the use of low cost metal alloy bushings instead of conventional high cost platinum-rhodium bushings in the formation of the glass fibers. In particular, the forming viscosity of the inventive E-glass is less than that of E-glass formed from conventional E-glass compositions, which have forming viscosities in a range from 2150° F. to 2350° F. By utilizing a metal alloy bushing such as a palladium-based alloy bushing, manufacturing costs associated with E-glass fiber production, products used in general applications (e.g., reinforcements), and yarn products for printed circuit boards may be dramatically reduced. The energy necessary to melt the inventive E-glass is less than the energy necessary to melt commercially available E-glass formulations. Such lower energy requirements may lower the overall manufacturing costs associated with the inventive E-glass.

The forming viscosity of a glass composition is often defined by its log 3 temperature. The log 3 temperature is the temperature at which the molten glass composition has a viscosity of 1,000 poise (i.e., roughly the fiberizing viscosity), where the viscosity is determined by measuring the torque needed to rotate a cylinder immersed in the molten glass material according to ASTM C965. Lowering the fiberizing temperature may reduce the production cost of the glass fibers because it allows for a longer bushing life, increased throughput, and reduced energy usage. By lowering the log 3 viscosity, a bushing operates at a cooler temperature and does not quickly "sag". Sag occurs in bushings held at an elevated temperature for extended periods of time. Lowering the log 3 temperature reduces the sag rate, and, as a result, the bushing life may be increased. In addition, a lower log 3 temperature permits the bushing to have a higher throughput since more glass can be melted in a given period of time. Thus, the production cost of the glass fibers may be reduced.

The liquidus temperature of the glass composition is the temperature below which the first crystal appears in the molten glass material when it is held at that temperature for 16 hours, according to ASTM C829. Additionally, the liquidus temperature is the greatest temperature at which devitrification can occur upon cooling the glass melt. At all temperatures above the liquidus temperature, the glass is completely molten and free of crystals.

The difference between the log 3 temperature and the liquidus temperature is termed "$\Delta T$". A larger $\Delta T$ offers a greater degree of flexibility during fiberizing and helps to avoid devitrification, which is the formation of crystals within the glass melt. Increasing the $\Delta T$ also reduces the production cost of the glass fibers by allowing for a greater bushing life and a less sensitive forming process.

The inventive composition lowers the viscosity of the molten E-glass so that a high $\Delta T$ is achieved and the glass composition can be utilized in a glass forming apparatus that contains a platinum and rhodium-free bushing, such as a palladium alloy bushing. If the $\Delta T$ is too small, the molten E-glass may crystallize within the fiberizing apparatus and cause a break in the manufacturing process. It is preferred that the log 3 temperature of the inventive E-glass composition is less than 2150° F., and even more preferably less than or equal to 2100° F. In at least one exemplary embodiment of the present invention, the log 3 temperature falls within a range from 1750° F. to 2100° F. Desirably, the liquidus temperature ranges from about 1750° F. to about 2100° F. such that the $\Delta T$ is greater than or equal to about 50° F. In some exemplary embodiments of the present invention, the $\Delta T$ ranges from 50° F. to 250° F. It is preferred that the $\Delta T$ be as large as possible for a given forming viscosity, although other factors such as raw material costs should be considered when selecting a glass composition for production.

Despite the lower viscosity of the inventive E-glass, the $\Delta T$, tensile modulus, density, strength, and refractive index are similar to traditional boron-containing E-glass compositions. Thus, the composition of the present invention retains the ability to make a commercially acceptable E-glass fiber and fiber product produced from the E-glass fibers and is able to reduce the cost of production by utilizing a bushing that is free or substantially free of platinum and rhodium. As used herein, the phrase "substantially free" is meant to indicate that a percentage of the bushing is formed of precious metals, particularly platinum and/or rhodium. The percentage may be a very small amount, such as, for example, a trace amount (e.g., less than 5%), or it may be a larger percentage, such as up to 25% or up to 50% of the bushing. It is to be appreciated that even at a 50% inclusion of precious metals in the bushing, a large cost savings is achieved due to the extremely high cost of the precious metals. It is an advantageous feature of the inventive composition that the E-glass composition enables the use of a platinum/rhodium free bushing, unlike conventional E-glass compositions that require a platinum/rhodium bushing. Furthermore, the addition of some platinum and/or rhodium in the bushing may enable the bushing to have a longer life.

The inventive E-glass composition includes the following components in the weight percent ranges given in Table 4. Preferred weight percentages of the components are set forth in Table 5. As used herein, the terms "weight percent" and "percent by weight" are meant to denote the weight percent (or percent by weight) based on the total composition.

TABLE 4

|  | % by weight |
| --- | --- |
| $B_2O_3$ | 8–10 |
| CaO | 16–23 |
| $Al_2O_3$ | 12–14 |
| $SiO_2$ | 52–54 |
| MgO | 0–3 |
| $TiO_2$ | 0–1.5 |
| $Fe_2O_3$ | 0–0.8 |
| $F_2$ | 0–1 |
| $Na_2O$ | 0–2 |
| $K_2O$ | 0–2 |
| $Li_2O$ | 0–3 |
| ZnO | 0–4 |
| $Na_2O + K_2O$ | 0–2 |
| Log 3 Temperature (° F.) | <2150 |
| Liquidus Temperature (° F.) | ≦2100 |
| $\Delta T$ | ≧50 |

TABLE 5

|  | % by weight |
| --- | --- |
| $B_2O_3$ | 8–10 |
| CaO | 18–23 |
| $Al_2O_3$ | 12–14 |
| $SiO_2$ | 52–53 |
| MgO | 0–3 |
| $TiO_2$ | 0–1 |
| $Fe_2O_3$ | 0–0.5 |
| $F_2$ | 0–1 |
| $Na_2O$ | 0–2 |
| $K_2O$ | 0–1 |
| $Li_2O$ | 0–2 |
| ZnO | 0–2 |
| $Na_2O + K_2O$ | 0–2 |
| Log 3 Temperature (° F.) | ≦2100 |
| Liquidus Temperature (° F.) | ≦2000 |
| $\Delta T$ | ≧100 |

It is to be appreciated that impurities or tramp materials may be present in the E-glass compositions without adversely affecting the glasses or the fibers. These impurities may enter the glass as raw material impurities or may be products formed by the chemical reaction of the molten glass with furnace components.

In general, fibers according to the present invention may be formed by obtaining the raw materials or ingredients and mixing or blending the components in a conventional manner in the appropriate quantities to give the desired weight percentages of the final composition. For example, the components may be obtained from suitable ingredients or raw materials such as sand for $SiO_2$, limestone for CaO, and dolomite for MgO. The composition may optionally contain trace quantities of other components or impurities. The mixed batch is then melted in a furnace or melter, and the resulting molten glass is passed along a forehearth and into non-platinum based bushings located along the bottom of the forehearth. The molten glass is pulled or attenuated through holes or orifices in the bottom or tip plate of the bushing to form individual E-glass filaments or fibers. Strands of E-glass fibers are formed by gathering the individual filaments together, such as with a gathering shoe. The strands are each formed of a plurality of individual E-glass filaments and may be wound on a forming tube mounted on a rotatable collet of a winding machine. The fibers may be further processed in a conventional manner suitable for the intended application.

The fibers formed from the inventive E-glass compositions may be formed using a lower energy cost due to the lower energy input needed to melt the glass composition and its lower melting temperatures. By lowering the melting temperature of the glass composition to a temperature that is less than conventional E-glass compositions, less energy is utilized to raise the temperature of the melter to a temperature that is sufficient to melt the glass composition. Additionally, the lower melting temperatures of the E-glass compositions may enable the use of cheaper refractories to melt the glass, which would further lower the overall cost of the glass fibers.

The ability to melt and deliver a glass at lower temperatures may also enable the production of glasses with a $\Delta T$ that is less than the $\Delta T$ of conventional E-glass compositions. In other words, the ability to fiberize glasses with a smaller forming window may be possible at lower forming temperatures due to a greater ability to control the glass temperature delivered to the bushing. Traditional E-glasses require $\Delta T$ values greater than 100° F., whereas the inventive E-glass compositions may be formed at $\Delta T$ values as low as 50° F. because of improved temperature control at lower temperatures.

The temperatures of the molten E-glass at the furnace, forehearth, and bushing are selected to appropriately adjust the viscosity of the glass. The operating temperatures may be maintained using standard manufacturing equipment such as PLC-based controls. Preferably, the temperature at the front end of the melter is automatically controlled to reduce or eliminate devitrification. Additionally, the control of the glass temperature often improves at lower temperatures. Therefore, glasses that possess lower $\Delta T$ temperatures may be manufactured provided that the forming temperature is significantly less than traditional E-glass compositions (e.g., at least 100° F. less than traditional E-glass formulations).

In general, the platinum and rhodium free bushing or bushing that is substantially free of platinum and rhodium utilized in the formation of E-glass fibers from the inventive composition should be structured to provide long life and resist sagging, which is dependent upon the pressure of the glass on the tip plate and the temperature. The bushing may be formed of metal alloys such as precious metal-based alloys (e.g., palladium-based alloys, ruthenium-based alloys, osmium-based alloys, iridium-based alloys, rhodium-based alloys, and/or platinum-based alloys), stainless steels (e.g., nickel and chromium stainless steels), Inconel® (a nickel-based alloy with chromium and iron manufactured by Inco Alloys International, Inc), RA-353 (a high temperature alloy manufactured by Rolled Alloys), and/or Haynes® 214 (a high temperature alloy manufactured by Haynes International, Inc). It is to be appreciated that although the inventive E-glass composition enables the elimination of expensive, precious metals such as platinum and rhodium in the bushing, it may be advantageous in some exemplary embodiments to use precious metals for key structural components, mechanical reinforcements, and corrosion resistance, such as T-gussets and tips.

Having generally described this invention, a further understanding can be obtained by reference to certain specific examples illustrated below which are provided for purposes of illustration only and are not intended to be all inclusive or limiting unless otherwise specified.

EXAMPLES

E-glass compositions according to the present invention were made by obtaining reagent grade raw materials in proportioned amounts according to the weight percentages set forth in Tables 6-13 to make 600 g of glass. The raw materials were melted in a platinum crucible in an electrically heated furnace at a temperature of 2650° F. for three hours. During the three hours of heating, the melt was stirred twice. The forming viscosity (i.e., log 3 temperature), liquidus temperature, and $\Delta T$ were measured for each of the E-glass compositions. The liquidus temperature was measured by placing glass cullet in a platinum boat and heating the boat in a thermal gradient furnace for 16 hours. The liquidus temperature was the highest temperature at which crystals formed. The viscosity was measured using a calibrated rotating spindle technique known to those of skill in the art utilizing a platinum bushing and a platinum spindle.

TABLE 6

| Chemical | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) | Ex. 8 (% by wt.) | Ex. 9 (% by wt.) | Ex. 10 (% by wt.) |
|---|---|---|---|---|---|---|---|---|---|---|
| $SiO_2$ | 52 | 52 | 52 | 52 | 52 | 52 | 52 | 52 | 52 | 52 |
| $Al_2O_3$ | 12 | 12 | 12 | 12 | 12 | 12 | 12 | 12 | 12 | 12 |
| $F_2$ | 0.2 | 0.2 | 0.2 | 0.2 | 0.2 | 0.2 | 0.2 | 0.2 | 0.2 | 0.2 |
| $Fe_2O_3$ | 0.3 | 0.3 | 0.3 | 0.3 | 0.3 | 0.3 | 0.3 | 0.3 | 0.3 | 0.3 |
| $Na_2O$ | 2 | 2 | 2 | 2 | 2 | 2 | 2 | 2 | 2 | 2 |
| $K_2O$ | 0 | 0 | 0 | 0 | 0 | 0 | 0 | 0 | 0 | 0 |
| CaO | 20 | 18 | 22 | 22 | 19.52 | 18.75 | 16.75 | 16 | 17.5 | 21.25 |
| MgO | 0 | 0 | 3 | 0.25 | 0.75 | 3 | 3 | 3 | 0 | 0 |
| $Li_2O$ | 0 | 3 | 0 | 3 | 2.25 | 3 | 0 | 2.25 | 3 | 0 |
| $TiO_2$ | 1.5 | 1.5 | 0 | 0 | 0.31 | 0.75 | 0.75 | 0 | 0 | 0 |
| ZnO | 3 | 3 | 0 | 0.25 | 2.25 | 0 | 3 | 2.25 | 3 | 2.25 |
| $B_2O_3$ | 9 | 8 | 8.5 | 8 | 8.4 | 8 | 10 | 10 | 10 | 10 |
| Log 3 Viscosity Temp (° F.) | 2070 | 1864 | 2049 | 1837 | 1895 | 1845 | 2076 | 1902 | 1847 | 2055 |

TABLE 6-continued

| Chemical | Ex. 1 (% by wt.) | Ex. 2 (% by wt.) | Ex. 3 (% by wt) | Ex. 4 (% by wt.) | Ex. 5 (% by wt.) | Ex. 6 (% by wt.) | Ex. 7 (% by wt.) | Ex. 8 (% by wt.) | Ex. 9 (% by wt.) | Ex. 10 (% by wt.) |
|---|---|---|---|---|---|---|---|---|---|---|
| Liquidus Temp (° F.) | 1825 | 1824 | 2016 | 1988 | 1898 | 1902 | 1938 | 1903 | 1805 | 1902 |
| ΔT (° F.) | 245 | 40 | 33 | −151 | −3 | −57 | 138 | −1 | 42 | 153 |

TABLE 7

| Chemical | Ex. 11 (% by wt.) | Ex. 12 (% by wt.) | Ex. 13 (% by wt) | Ex. 14 (% by wt.) | Ex. 15 (% by wt.) | Ex. 16 (% by wt.) | Ex. 17 (% by wt.) | Ex. 18 (% by wt.) | Ex. 19 (% by wt.) |
|---|---|---|---|---|---|---|---|---|---|
| $SiO_2$ | 52 | 52 | 52 | 52 | 52 | 52 | 52 | 52 | 52 |
| $Al_2O_3$ | 12 | 12 | 12 | 12 | 12 | 12 | 12 | 12 | 12 |
| $F_2$ | 0.2 | 0.2 | 0.2 | 0.2 | 0.2 | 0.2 | 0.2 | 0.2 | 0.2 |
| $Fe_2O_3$ | 0.3 | 0.3 | 0.3 | 0.3 | 0.3 | 0.3 | 0.3 | 0.3 | 0.3 |
| $Na_2O$ | 2 | 2 | 2 | 2 | 2 | 2 | 2 | 2 | 2 |
| $K_2O$ | 0 | 0 | 0 | 0 | 0 | 0 | 0 | 0 | 0 |
| CaO | 22 | 19 | 16.5 | 22 | 19 | 16 | 18.51 | 22 | 20.75 |
| MgO | 0 | 3 | 3 | 0 | 1.5 | 3 | 2.25 | 0.25 | 3 |
| $Li_2O$ | 1.5 | 0 | 3 | 1 | 0 | 3 | 2.25 | 3 | 1.75 |
| $TiO_2$ | 0 | 1.5 | 0 | 1.5 | 0 | 1.5 | 0.3 | 0 | 0 |
| ZnO | 0 | 0 | 3 | 1 | 3 | 1 | 0.75 | 0.25 | 0 |
| $B_2O_3$ | 10 | 10 | 8 | 8 | 10 | 9 | 9.4 | 8 | 8 |
| Log 3 Viscosity Temp (° F.) | 1925 | 2058 | 1858 | 1976 | 2064 | 1853 | 1892 | 1837 | 1919 |
| Liquidus Temp (° F.) | 1973 | 1964 | 1889 | 1934 | 1832 | 1887 | 1858 | 1955 | 1949 |
| ΔT (° F.) | −48 | 94 | −31 | 42 | 232 | −34 | 34 | −118 | −30 |

TABLE 8

| Chemical | Ex. 20 (% by wt.) | Ex. 21 (% by wt.) | Ex. 22 (% by wt) | Ex. 23 (% by wt.) | Ex. 24 (% by wt.) | Ex. 25 (% by wt.) | Ex. 26 (% by wt.) | Ex. 27 (% by wt.) | Ex. 28 (% by wt.) |
|---|---|---|---|---|---|---|---|---|---|
| $SiO_2$ | 52 | 52 | 52 | 52 | 52 | 52 | 52 | 52 | 52 |
| $Al_2O_3$ | 12 | 12 | 12 | 12 | 12 | 12 | 12 | 12 | 12 |
| $F_2$ | 0.2 | 0.2 | 0.2 | 0.2 | 0.2 | 0.2 | 0.2 | 0.2 | 0.2 |
| $Fe_2O_3$ | 0.3 | 0.3 | 0.3 | 0.3 | 0.3 | 0.3 | 0.3 | 0.3 | 0.3 |
| $Na_2O$ | 2 | 2 | 2 | 2 | 2 | 2 | 2 | 2 | 2 |
| $K_2O$ | 0 | 0 | 0 | 0 | 0 | 0 | 0 | 0 | 0 |
| CaO | 22 | 17.5 | 18 | 20 | 22 | 20.14 | 19 | 18 | 22 |
| MgO | 0.5 | 3 | 0 | 0 | 0.75 | 2.25 | 3 | 3 | 0.5 |
| $Li_2O$ | 0 | 3 | 3 | 3 | 0 | 0.75 | 0 | 0 | 0 |
| $TiO_2$ | 0 | 0 | 1.5 | 1.5 | 0.75 | 3.1 | 1.5 | 1.5 | 0 |
| ZnO | 3 | 0 | 3 | 0 | 0 | 1.63 | 0 | 3 | 3 |
| $B_2O_3$ | 8 | 10 | 8 | 9 | 10 | 8.4 | 10 | 8 | 8 |
| Log 3 Viscosity Temp (° F.) | 2043 | 1841 | 1865 | 1844 | 2046 | 1989 | 2059 | 2071 | 2064 |
| Liquidus Temp (° F.) | 1961 | 1876 | 1845 | 1912 | 1901 | 1898 | 1981 | 1952 | 1957 |
| ΔT (° F.) | 82 | −35 | 20 | −68 | 145 | 91 | 78 | 119 | 107 |

TABLE 9

| Chemical | Ex. 29 (% by wt.) | Ex. 30 (% by wt.) | Ex. 31 (% by wt) | Ex. 32 (% by wt.) | Ex. 33 (% by wt.) | Ex. 34 (% by wt.) | Ex. 35 (% by wt.) | Ex. 36 (% by wt.) | Ex. 37 (% by wt.) |
|---|---|---|---|---|---|---|---|---|---|
| $SiO_2$ | 52 | 52 | 52 | 52 | 52 | 54 | 52 | 54 | 54 |
| $Al_2O_3$ | 12 | 12 | 12 | 12 | 12 | 12 | 12 | 14 | 14 |
| $F_2$ | 0.2 | 0.2 | 0.2 | 0 | 1 | 1 | 1 | 0 | 1 |
| $Fe_2O_3$ | 0.3 | 0.3 | 0.3 | 0.3 | 0.3 | 0.3 | 0.3 | 0.3 | 0.3 |
| $Na_2O$ | 2 | 2 | 2 | 0 | 0 | 1 | 0 | 1 | 1 |
| $K_2O$ | 0 | 0 | 0 | 0 | 0 | 0 | 0 | 0 | 0 |
| CaO | 16 | 17.5 | 17.5 | 20 | 20 | 20 | 19.2 | 16 | 16 |

TABLE 9-continued

| Chemical | Ex. 29 (% by wt.) | Ex. 30 (% by wt.) | Ex. 31 (% by wt) | Ex. 32 (% by wt.) | Ex. 33 (% by wt.) | Ex. 34 (% by wt.) | Ex. 35 (% by wt.) | Ex. 36 (% by wt.) | Ex. 37 (% by wt.) |
|---|---|---|---|---|---|---|---|---|---|
| MgO | 1.5 | 0 | 0 | 2 | 0 | 0 | 2 | 0 | 2 |
| $Li_2O$ | 1.5 | 3 | 3 | 0 | 0 | 1 | 2 | 0 | 1 |
| $TiO_2$ | 1.5 | 0 | 1.5 | 1.5 | 0 | 1.5 | 1.5 | 1.5 | 0 |
| ZnO | 3 | 3 | 1.5 | 4.2 | 4.7 | 1.2 | 0 | 3.2 | 0.7 |
| $B_2O_3$ | 10 | 10 | 10 | 8 | 10 | 8 | 10 | 10 | 10 |
| Log 3 Viscosity Temp (° F.) | 1961 | 1847 | 1852 | 2099 | 2093 | 2094 | 2016 | 2229 | 2132 |
| Liquidus Temp (° F.) | 1777 | 1783 | 1762 | 2001 | 2064 | >1966 | >2000 | 1972 | 1943 |
| ΔT (° F.) | 184 | 64 | 90 | 98 | 29 | — | — | 257 | 189 |

TABLE 10

| Chemical | Ex. 38 (% by wt.) | Ex. 39 (% by wt.) | Ex. 40 (% by wt) | Ex. 41 (% by wt.) | Ex. 42 (% by wt.) | Ex. 43 (% by wt.) | Ex. 44 (% by wt.) | Ex. 45 (% by wt.) | Ex. 46 (% by wt.) |
|---|---|---|---|---|---|---|---|---|---|
| $SiO_2$ | 52 | 54 | 52 | 54 | 54 | 52 | 54 | 52 | 52 |
| $Al_2O_3$ | 14 | 12 | 12 | 14 | 14 | 14 | 13.2 | 12 | 14 |
| $F_2$ | 1 | 0 | 1 | 0 | 0 | 0 | 1 | 0 | 0 |
| $Fe_2O_3$ | 0.3 | 0.3 | 0.3 | 0.3 | 0.3 | 0.3 | 0.3 | 0.3 | 0.3 |
| $Na_2O$ | 1 | 0 | 1 | 0 | 0 | 0 | 0 | 1 | 0 |
| $K_2O$ | 0 | 0 | 0 | 0 | 0 | 0 | 0 | 0 | 0 |
| CaO | 20 | 20 | 17.2 | 16 | 18.2 | 20 | 16 | 20 | 20 |
| MgO | 2 | 2 | 0 | 2 | 2 | 0 | 2 | 0 | 2 |
| $Li_2O$ | 0 | 2 | 1 | 2 | 0 | 2 | 2 | 1 | 0 |
| $TiO_2$ | 1.5 | 1.5 | 1.5 | 1.5 | 1.5 | 1.5 | 1.5 | 1.5 | 0 |
| ZnO | 0.2 | 0.2 | 6 | 2.2 | 0 | 0.2 | 0 | 2.2 | 1.7 |
| $B_2O_3$ | 8 | 8 | 8 | 8 | 10 | 10 | 10 | 10 | 10 |
| Log 3 Viscosity Temp (° F.) | 2111 | 1981 | 2019 | 2037 | 2187 | 1983 | 2009 | 2000 | 2130 |
| Liquidus Temp (° F.) | 1947 | 1916 | 1837 | 1906 | >2000 | 1791 | 1855 | 1817 | 1874 |
| ΔT (° F.) | 164 | 65 | 182 | 131 | — | 192 | 154 | 183 | 256 |

TABLE 11

| Chemical | Ex. 47 (% by wt.) | Ex. 48 (% by wt.) | Ex. 49 (% by wt) | Ex. 50 (% by wt.) | Ex. 51 (% by wt.) | Ex. 52 (% by wt.) | Ex. 53 (% by wt.) | Ex. 54 (% by wt.) | Ex. 55 (% by wt.) |
|---|---|---|---|---|---|---|---|---|---|
| $SiO_2$ | 52 | 52 | 54 | 54 | 54 | 52 | 54 | 52 | 54 |
| $Al_2O_3$ | 12 | 14 | 14 | 14 | 12 | 14 | 14 | 14 | 14 |
| $F_2$ | 1 | 0 | 0 | 0 | 0 | 0 | 1 | 0 | 1 |
| $Fe_2O_3$ | 0.3 | 0.3 | 0.3 | 0.3 | 0.3 | 0.3 | 0.3 | 0.3 | 0.3 |
| $Na_2O$ | 0 | 0 | 0 | 0 | 0 | 1 | 0 | 0 | 1 |
| $K_2O$ | 0 | 0 | 0 | 0 | 0 | 0 | 0 | 0 | 0 |
| CaO | 16.7 | 17.7 | 16.2 | 16 | 16 | 16 | 16 | 16 | 18.7 |
| MgO | 0 | 0 | 0 | 0 | 2 | 2 | 0 | 0 | 2 |
| $Li_2O$ | 2 | 0 | 0 | 2 | 2 | 1 | 2 | 2 | 1 |
| $TiO_2$ | 0 | 0 | 1.5 | 0 | 0 | 0 | 0 | 1.5 | 0 |
| ZnO | 6 | 6 | 6 | 5.7 | 3.7 | 5.7 | 2.7 | 4.2 | 0 |
| $B_2O_3$ | 10 | 10 | 8 | 8 | 10 | 8 | 10 | 10 | 8 |
| Log 3 Viscosity Temp (° F.) | 1949 | 2163 | 2229 | 2059 | 2002 | 2065 | 2040 | 2010 | 2067 |
| Liquidus Temp (° F.) | 1820 | 2021 | >2030 | 1879 | 1861 | 1913 | 1817 | 1792 | 1900 |
| ΔT (° F.) | 129 | 142 | — | 180 | 141 | 152 | 223 | 218 | 167 |

TABLE 12

| Chemical | Ex. 56 (% by wt.) | Ex. 57 (% by wt.) | Ex. 58 (% by wt) | Ex. 59 (% by wt.) | Ex. 60 (% by wt.) | Ex. 61 (% by wt.) | Ex. 62 (% by wt.) | Ex. 63 (% by wt.) | Ex. 64 (% by wt.) |
|---|---|---|---|---|---|---|---|---|---|
| $SiO_2$ | 52 | 54 | 54 | 53 | 54 | 52 | 54 | 54 | 54 |
| $Al_2O_3$ | 12 | 12 | 12 | 13 | 12 | 12 | 12 | 12 | 14 |
| $F_2$ | 0 | 0.2 | 1 | 0.50 | 0 | 0 | 1 | 0 | 1 |
| $Fe_2O_3$ | 0.3 | 0.3 | 0.3 | 0.3 | 0.3 | 0.3 | 0.3 | 0.3 | 0.3 |
| $Na_2O$ | 1 | 0 | 0 | 0.49 | 0 | 1 | 1 | 1 | 1 |
| $K_2O$ | 0 | 0 | 0 | 0 | 0 | 0 | 0 | 0 | 0 |
| CaO | 16 | 20 | 20 | 18 | 17.7 | 20 | 16 | 19.7 | 16 |
| MgO | 2 | 0 | 2 | 1 | 2 | 0 | 2 | 2 | 0 |
| $Li_2O$ | 0 | 2 | 0 | 0.74 | 0 | 1 | 0 | 1 | 0 |
| $TiO_2$ | 1.5 | 1.5 | 0 | 0.76 | 0 | 0 | 1.5 | 0 | 0 |
| ZnO | 5.2 | 0 | 2.7 | 3.16 | 6 | 5.7 | 4.2 | 0 | 5.7 |
| $B_2O_3$ | 10 | 10 | 8 | 9 | 8 | 8 | 8 | 10 | 8 |
| Log 3 Viscosity Temp (° F.) | 2105 | 1973 | 2134 | 2072 | 2162 | 2011 | 2151 | 2026 | 2205 |
| Liquidus Temp (° F.) | 1962 | 1866 | 2114 | 1890 | 2109 | 1840 | >1970 | 1902 | >1970 |
| ΔT (° F.) | 143 | 107 | 20 | 182 | 53 | 171 | — | 124 | — |

TABLE 13

| Chemical | Ex. 65 (% by wt.) | Ex. 66 (% by wt.) | Ex. 67 (% by wt) | Ex. 68 (% by wt.) | Ex. 69 (% by wt.) | Ex. 70 (% by wt.) | Ex. 71 (% by wt.) | Ex. 72 (% by wt.) | Ex. 73 (% by wt.) |
|---|---|---|---|---|---|---|---|---|---|
| $SiO_2$ | 52 | 54 | 52 | 54 | 54 | 54 | 53 | 52 | 52 |
| $Al_2O_3$ | 12 | 12 | 14 | 12 | 14 | 14 | 13 | 14 | 14 |
| $F_2$ | 1 | 0 | 1 | 0 | 0 | 1 | 0.50 | 1 | 1 |
| $Fe_2O_3$ | 0.3 | 0.3 | 0.3 | 0.3 | 0.3 | 0.3 | 0.3 | 0.3 | 0.3 |
| $Na_2O$ | 0 | 0 | 0 | 1 | 1 | 0 | 0.49 | 0 | 1 |
| $K_2O$ | 0 | 0 | 0 | 0 | 0 | 0 | 0 | 0 | 0 |
| CaO | 16 | 20 | 16 | 16 | 20 | 20 | 18 | 20 | 20 |
| MgO | 2 | 0 | 2 | 0 | 0 | 0 | 1 | 0 | 0 |
| $Li_2O$ | 2 | 2 | 0 | 0 | 0 | 2 | 0.74 | 2 | 0.2 |
| $TiO_2$ | 1.5 | 0 | 1.5 | 1.5 | 0 | 0 | 0.76 | 0 | 1.5 |
| ZnO | 5.2 | 3.7 | 3.2 | 5.2 | 2.7 | 0 | 3.15 | 2.7 | 0 |
| $B_2O_3$ | 8 | 8 | 10 | 10 | 8 | 8.7 | 9 | 8 | 10 |
| Log 3 Viscosity Temp (° F.) | 1962 | 1991 | 2158 | 2169 | 2170 | 1996 | 2077 | 1974 | 2099 |
| Liquidus Temp (° F.) | 1822 | 1871 | >1991 | >1984 | 1985 | 1787 | 1882 | 1856 | 1848 |
| ΔT (° F.) | 140 | 120 | — | — | 185 | 209 | 195 | 118 | 251 |

The data obtained from the inventive E-glass compositions set forth in Example 1 through Example 73 was calculated to obtain the average viscosity, liquidus temperature, and ΔT. The results demonstrated that the inventive E-glass compositions had an average viscosity less than 2150° F., an average liquidus temperature less than 2100° F., and an average ΔT greater than 50° F. As shown in Tables 6-13, the liquidus temperature and the ΔT of the inventive compositions were comparative to conventional E-glass according to ASTM D578. The viscosity of the inventive compositions were lower than conventional boron containing E-glass compositions, which, as discussed above, is between 2150° F. to 2350° F. The lower forming viscosity of the inventive E-glass compositions permits the use of lower cost, non platinum/rhodium based bushings.

One preferred embodiment of the inventive E-glass composition (i.e., Example 26 of Table 8) is set forth below in Table 14, together with the comparative physical and mechanical properties of a traditional boron-containing E-glass according to ASTM D578. As shown in Table 14, the physical and mechanical properties of the inventive E-glass composition were similar to those corresponding properties of the traditional boron-containing E-glass composition. Comparing the data obtained from Examples 1-73 in Tables 6-13 and the data set forth in Table 14, it can be concluded that the inventive E-glass compositions maintain or exceed the physical properties of conventional E-glass compositions. In addition, the compositions of the present invention retain the ability to make a commercially acceptable E-glass fiber and reduce the cost of production of the fibers by utilizing a platinum and rhodium-free bushing (or a bushing that is substantially free of platinum and/or rhodium) due to their lower viscosities (i.e., compared to conventional E-glass compositions).

TABLE 14

| Properties | Inventive E-glass Composition (Example 26) | Traditional Boron-Containing E-glass Composition |
|---|---|---|
| Log 3 Viscosity Temp (° F.) | 2046 | 2200 |
| Liquidus Temperature (° F.) | 1901 | 2000 |
| ΔT | 145 | 200 |
| Density (g/cc) | 2.61 | 2.58 |
| Sonic Modulus (MPSI) | 11.1 | 11.2 |
| Strength (KPSI) | 464 | 500 |

In Table 14, the strength is the measurement of the pristine fiber strength as the fiber was broken in tension. The sonic modulus was calculated by measuring the speed of sound in the E-glass fiber. It can be seen in Table 14 that the properties of the inventive E-glass composition are similar to the properties of a traditional boron containing E-glass. From a consumer standpoint, density and sonic modulus are important characteristics of a glass fiber. In the comparative example set forth in Table 14, the sonic modulus and strength of the inventive E-glass composition are virtually identical. Thus, the inventive E-glass composition is commercially acceptable and is provided at a lower cost due to the ability to utilize a bushing that is free of platinum and/or rhodium or one that contains significantly less platinum and/or rhodium than conventional bushings.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A composition for preparing E-glass fibers comprising:
   $B_2O_3$ in an amount from 8-10% by weight of the total composition,
   CaO in an amount from 16-23% by weight of the total composition,
   $Al_2O_3$ in an amount from 12-14% by weight of the total composition,
   $SiO_2$ in an amount from 52-54% by weight of the total composition,
   $Fe_2O_3$ in an amount from 0-0.8% by weight of the total composition,
   $TiO_2$ in an amount from 0-1.5% by weight of the total composition,
   MgO in an amount from 0-3% by weight of the total composition,
   $F_2$ in an amount from 0-1% by weight of the total composition,
   $Na_2O$ in an amount from 0-2% by weight of the total composition,
   $K_2O$ in an amount from 0-2% by weight of the total composition,
   $Li_2O$ in an amount from 0-3% by weight of the total composition, and
   ZnO in an amount from 0-4% by weight of the total composition
   wherein said composition has a log 3 temperature less than or equal to 2100° F.

2. The composition of claim 1, wherein said composition has a liquidus temperature less than about 2100° F.

3. The composition of claim 1, wherein said composition has a ΔT greater than or equal to 50° F.

4. The composition of claim 1, wherein said glass fibers formed from said composition are formed in a metal alloy bushing that is substantially free of platinum and rhodium.

5. The composition of claim 4, wherein said metal alloy bushing is free of platinum and rhodium.

6. The composition of claim 4, wherein said metal alloy bushing contains less than 5% of said bushing of at least one member selected from the group consisting of palladium-based alloys, ruthenium-based alloys, osmium-based alloys, iridium-based alloys, rhodium-based alloys, platinum-based alloys, nickel and chromium stainless steels and nickel-based alloys containing chromium and iron.

7. The composition of claim 1, wherein
   said $B_2O_3$ is present in said composition in an amount from 8-10% by weight of the total composition,
   said CaO is present in said composition in an amount from 18-23% by weight of the total composition,
   said $Al_2O_3$ is present in said composition in an amount from 12-14% by weight of the total composition,
   said $SiO_2$ is present in said composition in an amount from 52-53% by weight of the total composition,
   said $Fe_2O_3$ is present in said composition in an amount from 0-0.5% by weight of the total composition,
   said $TiO_2$ is present in said composition in an amount from 0-1% by weight of the total composition,
   said MgO is present in said composition in an amount from 0-3% by weight of the total composition,
   said $F_2$ is present in said composition in an amount from 0-1% by weight of the total composition,
   said $Na_2O$ is present in said composition in an amount from 0-2% by weight of the total composition,
   said $K_2O$ is present in said composition in an amount from 0-1% by weight of the total composition,
   said $Li_2O$ is present in said composition in an amount from 0-2% by weight of the total composition, and
   said ZnO is present in said composition in an amount from 0-2% by weight of the total composition.

8. The composition of claim 1, wherein glass fibers formed from said composition are formed in a metal alloy bushing, said metal alloy bushing containing up to 50% of said bushing one or more precious metals selected from platinum, rhodium, palladium, ruthenium, osmium, iridium and combinations thereof.

9. The composition of claim 1, wherein glass fibers formed from said composition are formed in a metal alloy bushing, said metal alloy bushing containing up to 25% of said bushing one or more precious metals selected from platinum, rhodium, palladium, ruthenium, osmium, iridium and combinations thereof.

10. The composition of claim 1, wherein said composition has a log 3 temperature from about 1750° F. to about 2100° F.

11. The composition of claim 3, wherein said composition has a ΔT from 50° F. to about 250° F.

12. The composition of claim 3, wherein said composition has a ΔT greater than or equal to 100° F.

* * * * *